United States Patent
Wu

(10) Patent No.: US 11,408,493 B2
(45) Date of Patent: Aug. 9, 2022

(54) LINEAR ACTUATOR

(71) Applicant: J-STAR MOTOR INDUSTRIAL CO., LTD., Taichung (TW)

(72) Inventor: Wei-Fan Wu, Taichung (TW)

(73) Assignee: J-STAR MOTOR INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 17/450,072

(22) Filed: Oct. 6, 2021

(65) Prior Publication Data

US 2022/0221032 A1 Jul. 14, 2022

(30) Foreign Application Priority Data

Jan. 11, 2021 (CN) .......................... 202120061826.4

(51) Int. Cl.
*F16H 25/20* (2006.01)

(52) U.S. Cl.
CPC ....... *F16H 25/20* (2013.01); *F16H 2025/209* (2013.01); *F16H 2025/2031* (2013.01); *F16H 2025/2081* (2013.01)

(58) Field of Classification Search
CPC ............. F16H 25/20; F16H 2025/2031; F16H 2025/2081; F16H 2025/209
See application file for complete search history.

(56) References Cited

U.S. PATENT DOCUMENTS

| | | | |
|---|---|---|---|
| 2015/0330486 A1* | 11/2015 | Hu | F16H 57/0006 74/89.14 |
| 2016/0146317 A1* | 5/2016 | Tseng | F16C 19/545 74/89.37 |
| 2017/0219072 A1* | 8/2017 | Sørensen | H02K 7/14 |
| 2017/0363189 A1* | 12/2017 | Nunez | F16H 25/2006 |
| 2018/0029508 A1* | 2/2018 | Carl | B60N 2/366 |
| 2018/0031091 A1* | 2/2018 | Wu | F16H 25/2015 |
| 2018/0097422 A1* | 4/2018 | Gassner | H02K 7/1166 |
| 2020/0109773 A1* | 4/2020 | Sakurai | H02K 7/081 |
| 2020/0136465 A1* | 4/2020 | Knudsen | H02K 5/225 |
| 2020/0378483 A1* | 12/2020 | Lin | F16H 25/20 |
| 2020/0393028 A1* | 12/2020 | Mengel | F16H 25/2015 |
| 2021/0114486 A1* | 4/2021 | Becker | F16H 1/16 |
| 2021/0215237 A1* | 7/2021 | Wei | F16H 63/00 |

* cited by examiner

*Primary Examiner* — David M Fenstermacher
(74) *Attorney, Agent, or Firm* — CKC & Partners Co., LLC

(57) ABSTRACT

A linear actuator includes a main body and a gear box structure. The main body includes a housing, a motor, a composite worm gear assembly and a threaded rod. The housing includes an inner space. The composite worm gear assembly is disposed in the inner space and driven by the motor. The threaded rod is connected to the composite worm gear assembly. The gear box structure is detachably connected to the main body, and includes a lower cover, an upper cover and a controlling unit. The lower cover is detachably embedded in the housing, and includes a side notch and a lower notch. The upper cover is slidably and correspondingly covered with the lower cover to form an accommodation space. The controlling unit is disposed in the inner space. The side notch is corresponding to the composite worm gear assembly. The lower notch is corresponding to the motor.

10 Claims, 5 Drawing Sheets

LINEAR ACTUATOR

RELATED APPLICATIONS

This application claims priority to China Application Serial Number 202120061826.4, filed Jan. 11, 2021, which is herein incorporated by reference.

BACKGROUND

Technical Field

The present disclosure relates to a linear actuator. More particularly, the present disclosure relates to a linear actuator with easy detachment.

Description of Related Art

The conventional linear actuator includes a motor, a gear assembly, an electrical controlling unit and a housing. In the manufacturing and assembling process, the motor, the gear assembly and the electrical controlling unit are all disposed in the housing. Thus, the housing has to be packaged after the motor, the gear assembly and the electrical controlling unit disposed therein. Moreover, if the circuit of the electrical controlling unit need to be repaired, the housing of the linear actuator need to be detached to check the inner structure of the linear actuator.

Therefore, there is an urgent need for a solution of a linear actuator which is featured with easily assembling in today's market.

SUMMARY

According to one aspect of the present disclosure, a linear actuator includes a main body and a gear box structure. The main body includes a housing, a motor, a composite worm gear assembly and a threaded rod. The housing includes an inner space. The motor is disposed in the inner space. The composite worm gear assembly is disposed in the inner space and driven by the motor. An end of the threaded rod is accommodated in the inner space and connected to the composite worm gear assembly. The gear box structure is detachably connected to the main body, and includes a lower cover, an upper cover and a controlling unit. The lower cover is detachably embedded in the housing, and includes a side notch and a lower notch. The upper cover is slidably and correspondingly covered with the lower cover to form an accommodation space. The controlling unit is disposed in the accommodation space. The side notch is corresponding to the composite worm gear assembly, and the lower notch is corresponding to the motor.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
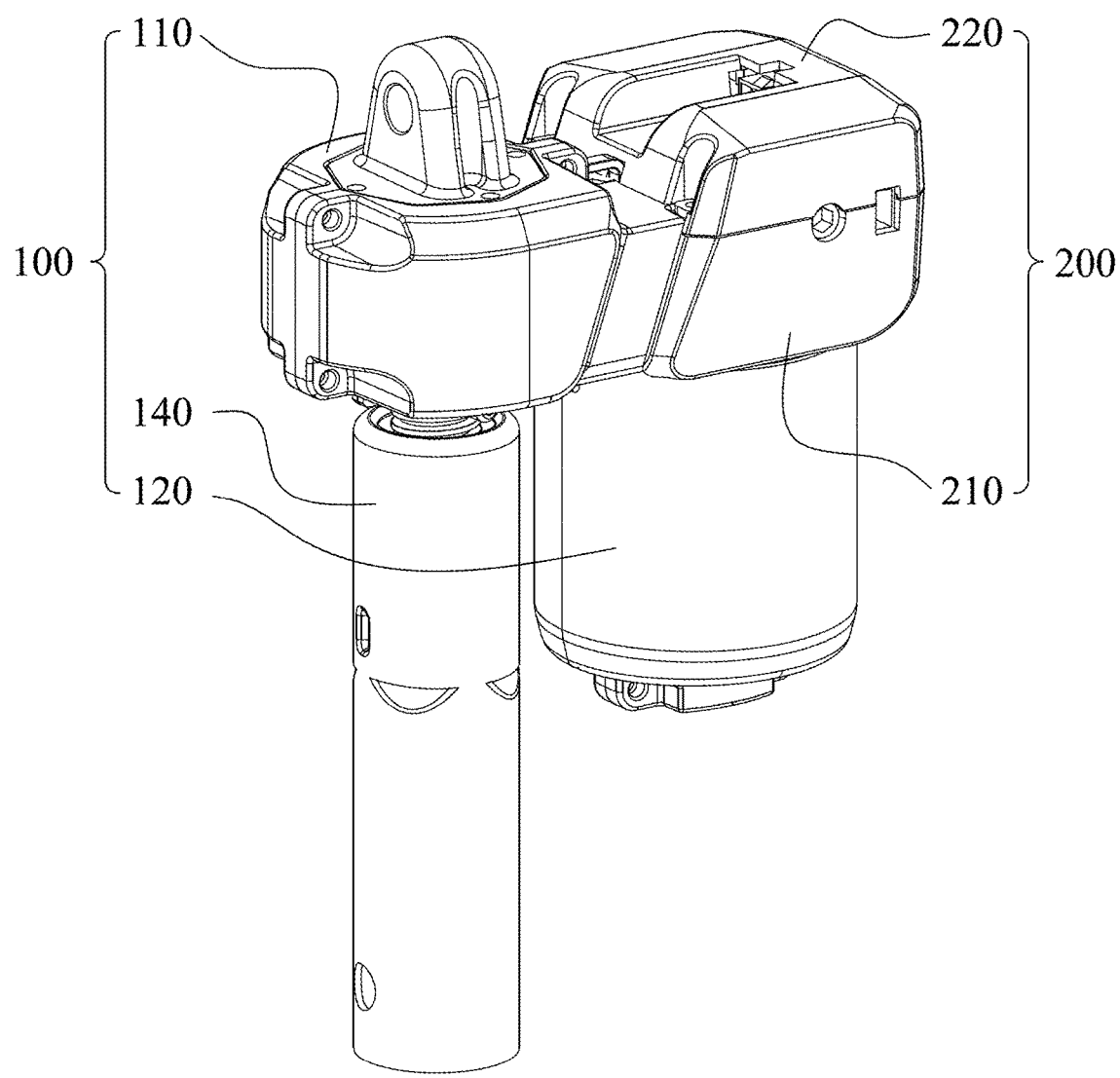
FIG. 1 shows a three-dimensional schematic view of a linear actuator according to one embodiment of the present disclosure.
Figure 2:
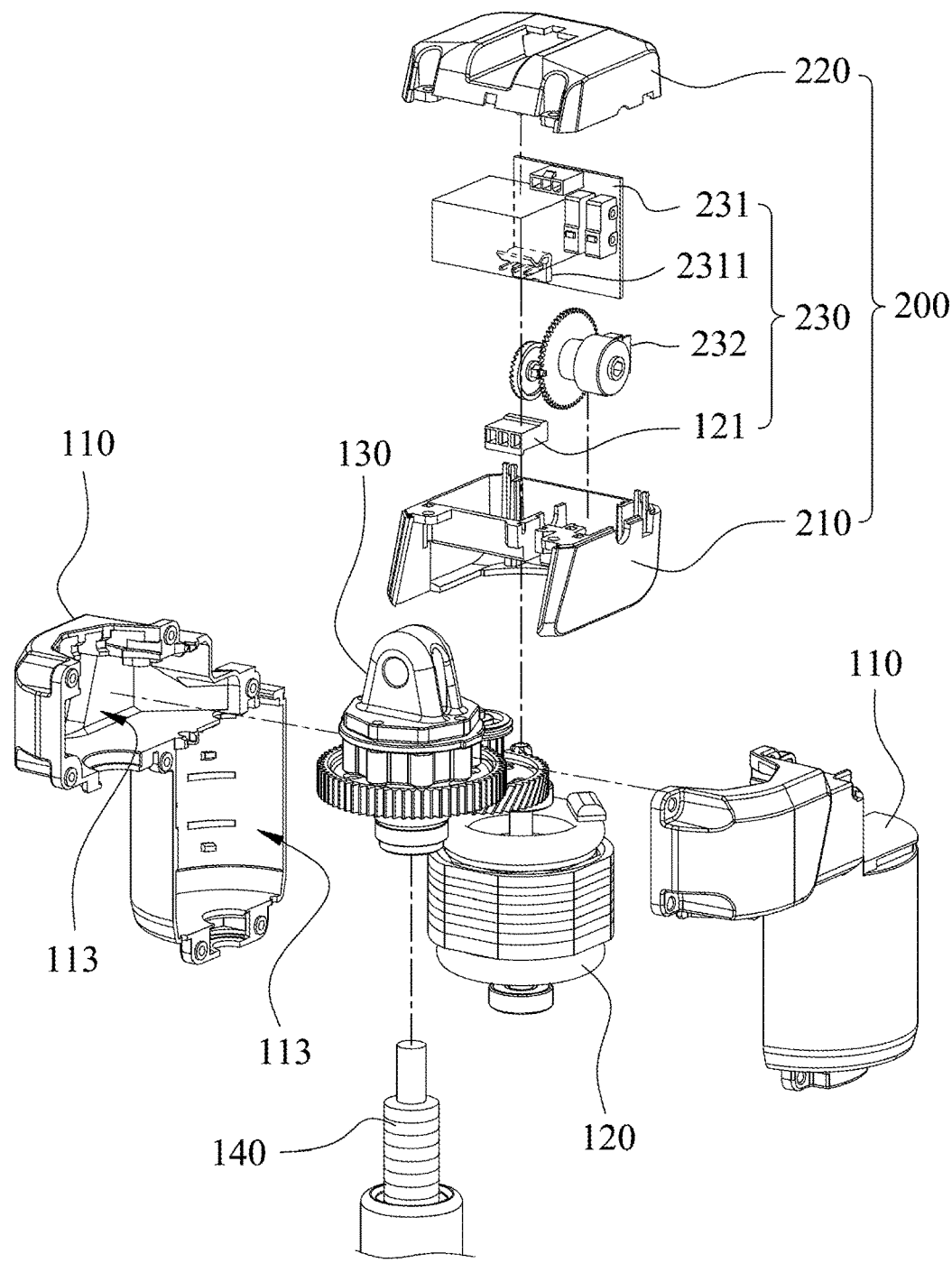
FIG. 2 shows a partial exploded view of the linear actuator according to the embodiment in FIG. 1.

Please refer to FIG. 1. FIG. 1 shows a three-dimensional schematic view of a linear actuator 10 according to one embodiment of the present disclosure. The linear actuator 10 includes a main body 100 and a gear box structure 200. The main body 100 includes a housing 110, a motor 120, a composite worm gear assembly 130 (as shown in FIG. 2) and a threaded rod 140. The gear box structure 200 is detachably connected to the main body 100, and includes a lower cover 210, an upper cover 220 and a controlling unit 230 (as shown in FIG. 2).

Figure 3:
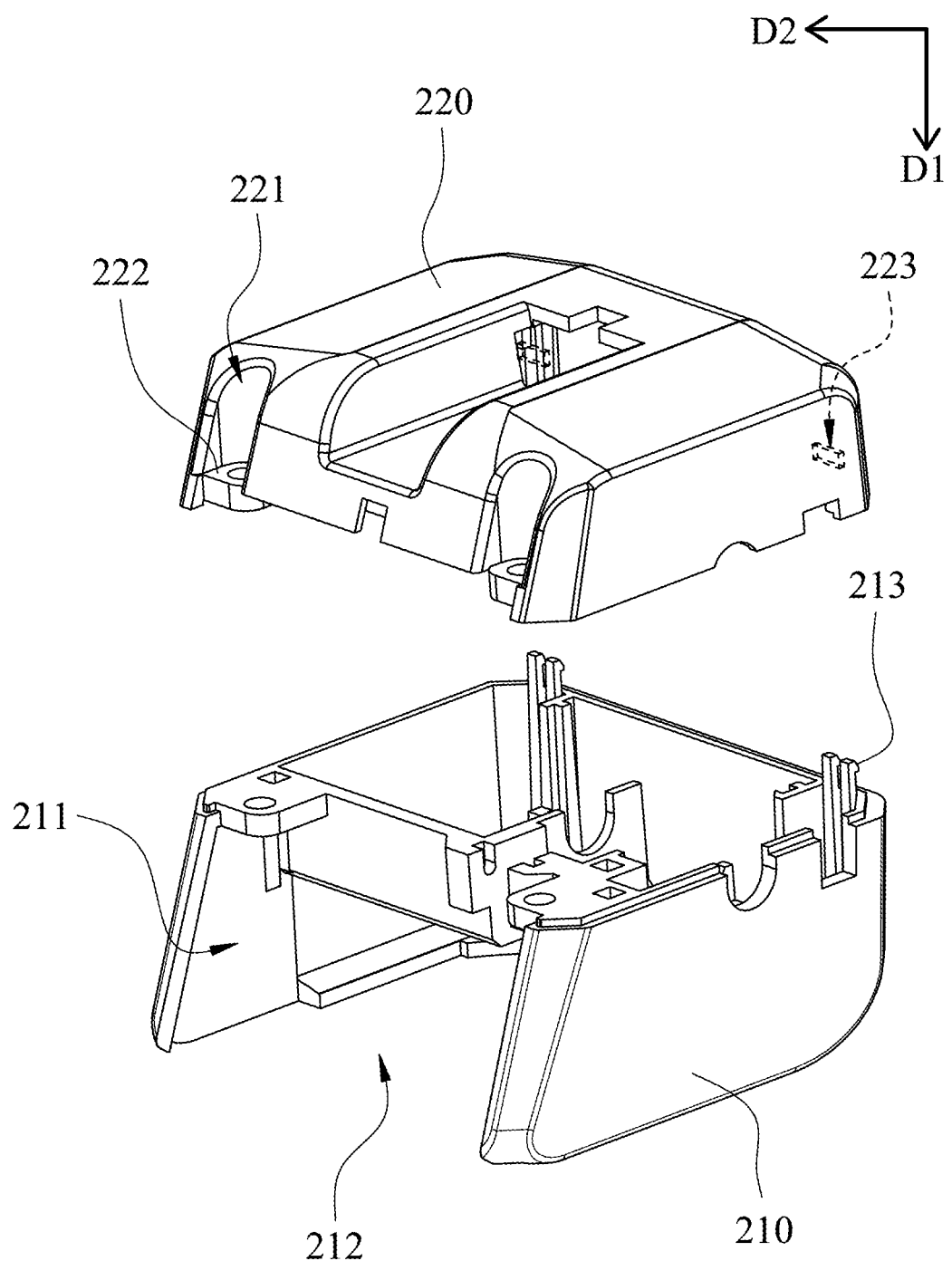
FIG. 3 shows a schematic view of an upper cover and a lower cover of the linear actuator according to the embodiment in FIG. 1.

Please refer to FIG. 1, FIG. 2 and FIG. 3. FIG. 2 shows a partial exploded view of the linear actuator 10 according to the embodiment in FIG. 1. FIG. 3 shows a schematic view of the upper cover 220 and the lower cover 210 of the linear actuator 10 according to the embodiment in FIG. 1. The housing 110 includes an inner space 113. The motor 120 is disposed in the inner space 113. The composite worm gear assembly 130 is disposed in the inner space 113 and driven by the motor 120. An end of the threaded rod 140 is accommodated in the inner space 113 and connected to the composite worm gear assembly 130. In detail, the inner space 113 of the housing 110 can be divided into different blocks to accommodate the motor 120 and the composite worm gear assembly 130. The motor 120, the composite worm gear assembly 130 and the threaded rod 140 are conventional, and the detail will not be described below.

Figure 4:
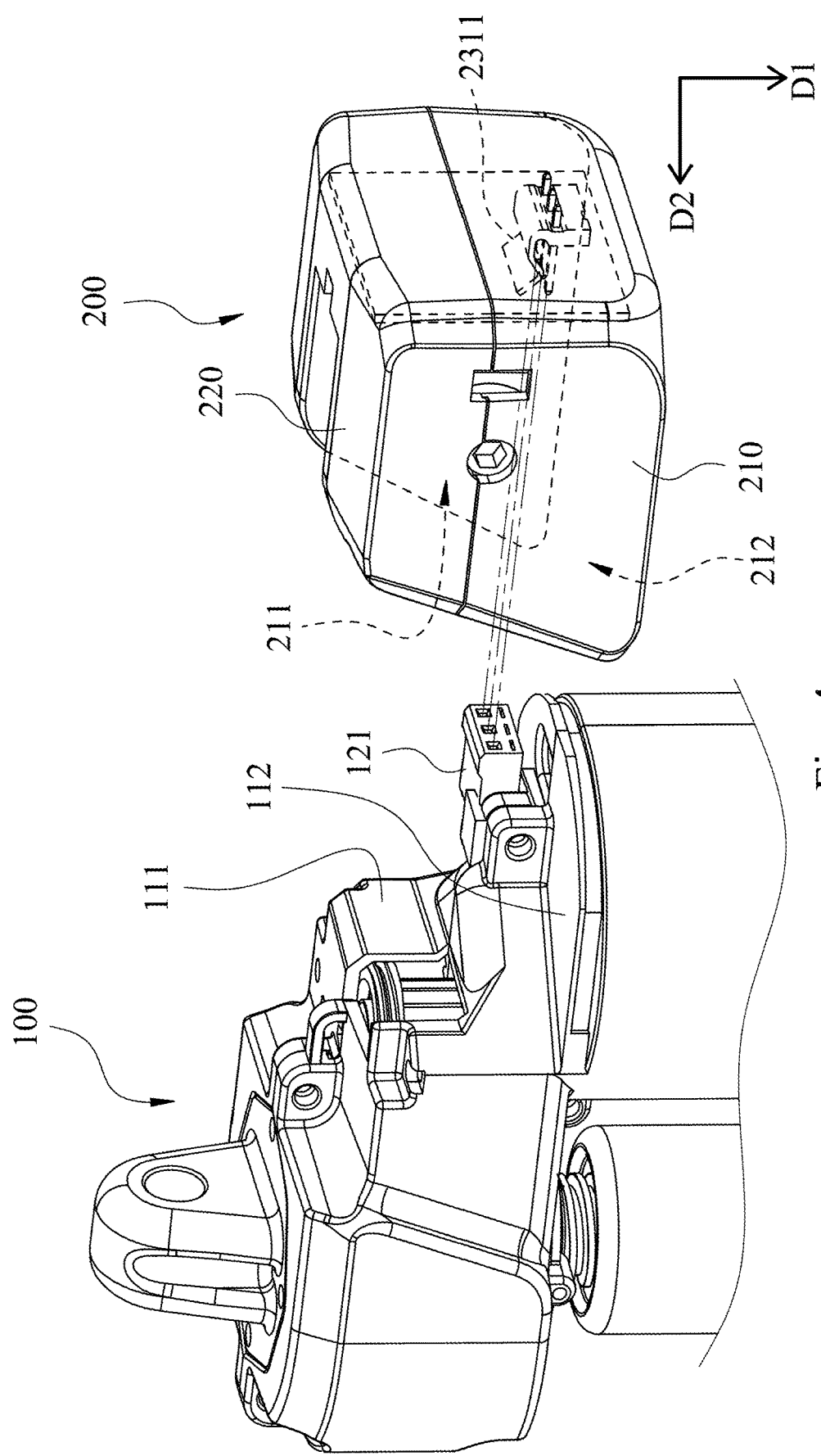
FIG. 4 shows a schematic view of a main body and a gear box structure of the linear actuator according to the embodiment in FIG. 1.

Please refer to FIG. 3 and FIG. 4. FIG. 4 shows a schematic view of a main body 100 and a gear box structure 200 of the linear actuator 10 according to the embodiment in FIG. 1. The upper cover 220 is slidably and correspondingly covered with the lower cover 210 to form an accommodation space. The controlling unit 230 is disposed in the accommodation space. The upper cover 220 includes two cylindrical grooves 221, two screw holes 222 and two grooves 223. The lower cover 210 is detachably embedded in the housing 110, and includes a side notch 211, a lower notch 212 and two fasteners 213. The two screw holes 222 are corresponding to the two cylindrical grooves 221, respectively, and each of the two screw holes 222 is for a screw to fix the gear box structure 200 on the main body 100. The two fasteners 213 are disposed on an end of the lower cover 210 which is corresponding to the side notch 211. The two fasteners 213 are fastened to the two grooves 223 of the upper cover 220, respectively. Moreover, in the embodiment of FIG. 3 and FIG. 4, the upper cover 220 is connected to the lower cover 210 along a vertical direction D1. When the upper cover 220 is connected to the lower cover 210, upper ends of the two fasteners 213 are positioned in the two grooves 223, respectively. In other embodiments of the present disclosure, the upper cover can be connected to the lower cover along a horizontal direction, and the user can change a number and a shape of the grooves and the fasteners according to the requirement, but the present disclosure is not limited thereto.

Thus, the linear actuator 10 can be assembled and disassembled in a short time easily via the gear box structure 200 which is detachably connected to the main body 100.

The housing 110 can further include a composite worm gear assembly disposing end 111 and a motor disposing end 112. The side notch 211 of the gear box structure 200 is corresponding to the composite worm gear assembly 130, and a shape of the side notch 211 is corresponding to a shape of the composite worm gear assembly disposing end 111. The lower notch 212 is corresponding to the motor 120, and a shape of the lower notch 212 is corresponding to a shape of the motor disposing end 112. In other words, the composite worm gear assembly 130 is disposed in the composite worm gear assembly disposing end 111 of the housing 110. Therefore, the shape of the composite worm gear assembly disposing end 111 is corresponding to the composite worm gear assembly 130. The motor 120 is disposed in the motor disposing end 112 of the housing 110. Thus, the shape of the motor disposing end 112 is corresponding to the motor 120. When the gear box structure 200 is combined with the main body 100, the side notch 211 is embedded in the composite worm gear assembly disposing end 111, and the lower notch 212 is embedded in the motor disposing end 112.

Thus, the linear actuator 10 can be assembled and disassembled in a short time easily by detachably connecting the side notch 211 and the lower notch 212 of the gear box structure 200 to the main body 100.

Figure 5:
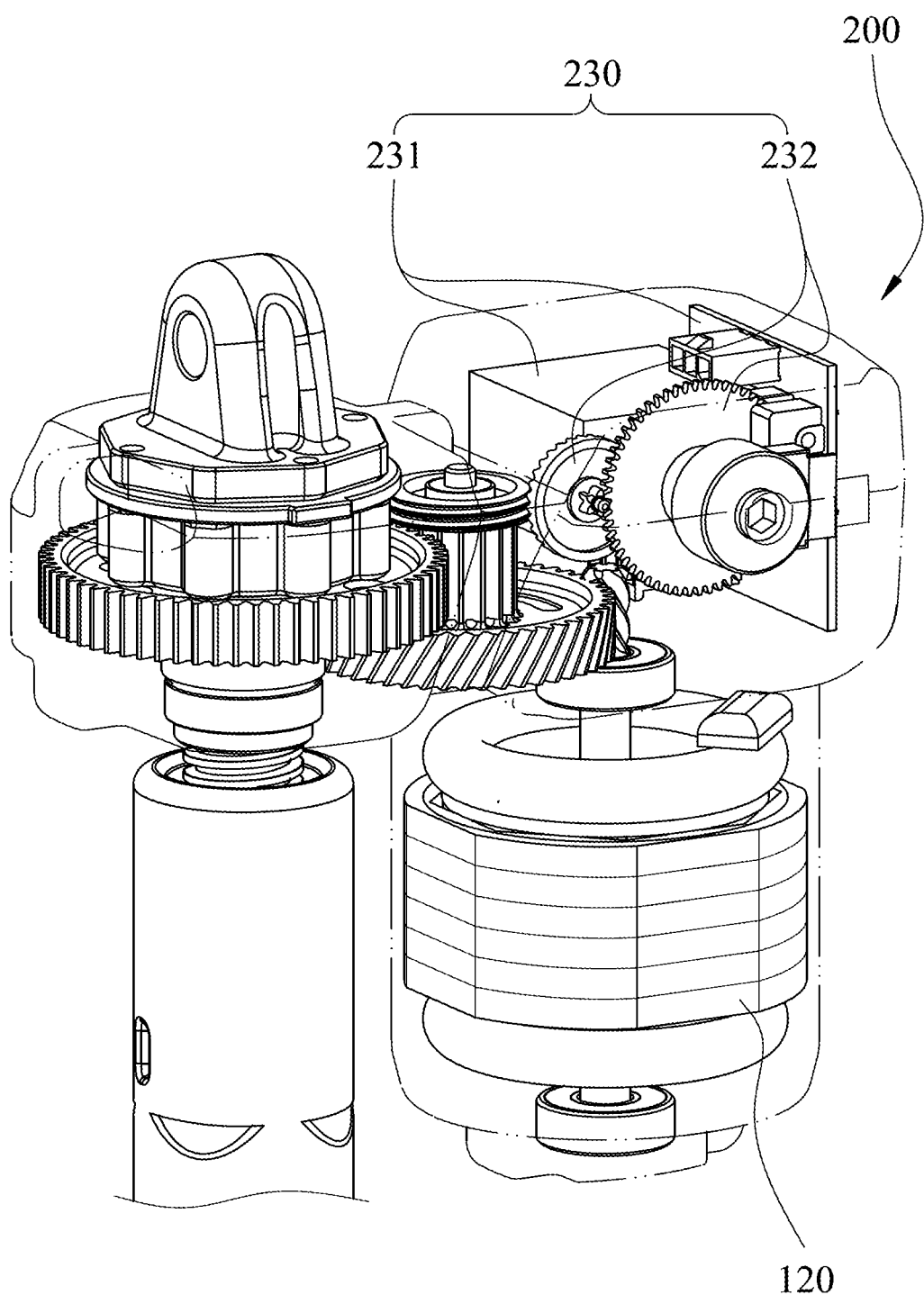
FIG. 5 shows a schematic view of combining the gear box structure and a motor of the linear actuator according to the embodiment in FIG. 1.

Please refer to FIG. 4 and FIG. 5. FIG. 5 shows a schematic view of combining the gear box structure 200 and a motor 120 of the linear actuator 10 according to the embodiment in FIG. 1. The controlling unit 230 includes a circuit controlling unit 231 and a gear assembly 232. The circuit controlling unit 231 is configured to drive the motor 120 to rotate. The gear assembly 232 is pivotally connected to the motor 120, and the gear assembly 232 is linked by the motor 120 to drive the composite worm gear assembly 130. The circuit controlling unit 231 includes a signal output end 2311 and an insert groove 121. An end of the insert groove 121 is electrically connected to the motor 120, and the other end of the insert groove 121 is detachably inserted into the signal output end 2311 to electrically connect the circuit controlling unit 231 with the motor 120. In detail, a control signal generated by the circuit controlling unit 231 outputs from the signal output end 2311. The insert groove 121 is electrically connected to the motor 120 and disposed in the motor disposing end 112. When the gear box structure 200 is combined with the main body 100, the control signal of the circuit controlling unit 231 is transmitted to the motor 120 via the signal output end 2311, which is inserted in the insert groove 121, thereby driving the motor 120. Therefore, the gear box structure 200 is connected to the main body 100 from the motor disposing end 112 along a horizontal direction D2.

Thus, it is favorable for assembling and disassembling the linear actuator 10 in a short time easily by replacing the wire connected between the gear box structure 200 and the main body 100 with the configuration of the signal output end 2311 and the insert groove 121.

According to the aforementioned embodiments and examples, the advantages of the present disclosure are described as follows.

1. The linear actuator can be assembled and disassembled in a short time easily via the gear box structure which is detachably connected to the main body.

2. The linear actuator can be assembled and disassembled in a short time easily by detachably connecting the side notch and the lower notch of the gear box structure to the main body.

3. It is favorable for assembling and disassembling the linear actuator in a short time easily by replacing the wire connected between the gear box structure and the main body with the configuration of the signal output end and the insert groove.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A linear actuator, comprising:
   a main body comprising:
      a housing comprising an inner space;
      a motor disposed in the inner space;
      a composite worm gear assembly disposed in the inner space and driven by the motor; and
      a threaded rod, an end of the threaded rod accommodated in the inner space and connected to the composite worm gear assembly; and
   a gear box structure detachably connected to the main body, and comprising:
      a lower cover detachably embedded in the housing, and comprising a side notch and a lower notch;
      an upper cover slidably and correspondingly covered with the lower cover to form an accommodation space; and
      a controlling unit disposed in the accommodation space;
   wherein the side notch is corresponding to the composite worm gear assembly, and the lower notch is corresponding to the motor.

2. The linear actuator of claim 1, wherein the upper cover comprising:
   two cylindrical grooves; and
   two screw holes corresponding to the two cylindrical grooves, respectively, wherein each of the two screw holes is for a screw to fix the gear box structure on the main body.

3. The linear actuator of claim 1, wherein,
the upper cover comprises two grooves; and
the lower cover further comprises two fasteners, and the two fasteners are disposed on an end of the lower cover corresponding to the side notch;
wherein the two fasteners of the lower cover are fastened to the two grooves of the upper cover, respectively.

4. The linear actuator of claim 1, wherein,
the housing further comprises a composite worm gear assembly disposing end, and a shape of the side notch is corresponding to a shape of the composite worm gear assembly disposing end.

5. The linear actuator of claim 1, wherein,
the housing further comprises a motor disposing end, and a shape of the lower notch is corresponding to a shape of the motor disposing end.

6. The linear actuator of claim 5, wherein the gear box structure is connected to the main body from the motor disposing end along a horizontal direction.

7. The linear actuator of claim 1, wherein the controlling unit comprises:

a circuit controlling unit configured to drive the motor to rotate; and a gear assembly pivotally connected to the motor, wherein the gear assembly is linked by the motor to drive the composite worm gear assembly.

8. The linear actuator of claim 7, wherein the circuit controlling unit comprises:

a signal output end; and an insert groove, an end of the insert groove electrically connected to the motor, and the other end of the insert groove detachably inserted into the signal output end to electrically connect the circuit controlling unit with the motor.

9. The linear actuator of claim 1, wherein the upper cover is connected to the lower cover along a vertical direction.

10. The linear actuator of claim 1, wherein the upper cover is connected to the lower cover along a horizontal direction.

* * * * *